United States Patent [19]

Ekiner et al.

[11] Patent Number: 5,085,774

[45] Date of Patent: Feb. 4, 1992

[54] POLYMERIC MEMBRANES

[75] Inventors: Okan M. Ekiner; George Vassilatos, both of Wilmington, Del.

[73] Assignee: E. I. Du Pont de Nemours and Company, Wilmington, Del.

[21] Appl. No.: 574,870

[22] Filed: Aug. 30, 1990

[51] Int. Cl.$^5$ .............................................. E01D 71/58
[52] U.S. Cl. .................. 210/500.23; 55/158; 210/500.39
[58] Field of Search .............. 210/500.23, 500.37, 210/500.38, 500.39; 55/158, 16

[56] References Cited

U.S. PATENT DOCUMENTS

| | | | |
|---|---|---|---|
| 3,851,025 | 11/1974 | Ram | 264/41 |
| 4,460,526 | 7/1984 | Makino et al. | 264/41 |
| 4,741,829 | 5/1988 | Takemura et al. | 210/500.23 |
| 4,863,496 | 9/1989 | Ekiner et al. | 55/158 |
| 4,885,092 | 12/1989 | Zwick | 210/500.41 |

FOREIGN PATENT DOCUMENTS 171619  1/1989  Japan .

OTHER PUBLICATIONS

J. P. Espenan, "Outer Skinned Hollow-Fibers-Spinning and Properties", Proc. of the Europe-Japan Congress on Membranes and Membrane Processes, 1984, pp. 151-161.

G. C. East et al., "Production of Porous Hollow Polysulphone Fibres for Gas Separation", Fourth BOC Priestly Conference, Royal Society of Chemistry, London (Special Publication No. 62), 1986, pp. 130-157.

P. Aplel et al., "Polysulfone Hollow Fibers Effect of Spinning Conditions on Ultrafiltration Properties", *Journal of Membrane Science* 22 (1985), pp. 199-215.

*Primary Examiner*—Frank Sever

[57] ABSTRACT

Improved polymeric membranes and their method of manufacture are disclosed. The improved membranes are produced by increasing the draw ratio employed during the manufacture of the membrane. The membranes show at least substantially constant or increased selectivity and mechanical properties as the draw ratio is increased.

5 Claims, No Drawings

POLYMERIC MEMBRANES

FIELD OF THE INVENTION

This invention relates to improved asymmetric membranes for gas separations and their methods of manufacture.

BACKGROUND OF THE INVENTION

In gas separations, it is advantageous to use membranes which possess the desired properties of selectivity, flux, and mechanical strength to withstand and prolong operation at high temperatures and pressures without suffering morphological compaction. In order for gas separations to be commercially viable, it is advantageous to use membranes that can be manufactured in large quantities at high product quality, and which can be inexpensively assembled into a permeator. Membranes which have been found to be particularly advantageous for commercial applications are asymmetric, hollow fiber membranes. These membranes have a thin separating layer integral with a porous substrate that provides support to the separating layer but which offers little, if any, resistance to passage of gases.

Hollow asymmetric fiber membranes that have a separating skin on the exterior of the fiber have a graded density skin, that is, a skin which exhibits maximum density on the exterior of the fiber at the surface which is farthest from the porous substructure. Asymmetric membranes are substantially chemically homogeneous and exhibit selective permeation for at least one gas of a gaseous mixture over that of at least one other gas of that mixture.

Processes for manufacture of asymmetric membranes must be capable of forming high quality membranes. Hollow fiber asymmetric membranes are commonly produced by air-gap spinning. In air-gap spinning, a solution of polymer is extruded through a spinneret suitable for forming the hollow fiber. During spinning of the fiber, a gas or liquid may be injected into the bore of the hollow fiber extrudate to maintain the configuration of the hollow fiber. The resulting hollow fiber extrudate travels through an air-gap prior to coagulation by known techniques such as by contact with a non-solvent for the polymer. The fibers are then collected onto a takeup roll or other suitable collection device.

The hollow fiber spinning process depends on many variables which may affect the morphology and properties of the hollow fiber membrane. These variables include the composition of the polymer solution employed to form the fiber, the composition of fluid injected into the bore of the hollow fiber extrudate during spinning, the coagulation medium employed to treat the hollow fiber extrudate, the rapidity of coagulation of the polymer, the rate of extrusion of the fiber, takeup speed of the fiber onto the takeup roll, and the like.

The hollow fiber membranes formed by the air-gap spinning process of the prior art are generally useful for separating gases. The utility of these membranes, however, may be limited by the decrease in selectivity that occurs as the draw ratio increases. Retention of selectivity while utilizing increased draw ratios would enable the resultant fibers to be produced at lower cost and to thereby find a greater range of applications than those membranes produced by the prior art.

SUMMARY OF THE INVENTION

Improved polymeric membranes and their method of manufacture are disclosed. The improved membranes are produced by increasing the draw ratio employed during the manufacture of the membrane. The membranes show increased selectivity and mechanical properties as the draw ratio is increased.

The present invention is directed to improved hollow membranes and their methods of manufacture. The invention, although applicable to membranes generally, has particular utility to hollow fiber, asymmetric membranes. The improved hollow membranes are produced by varying the ratio of takeup velocity to the average extrusion velocity of the nascent fiber in the spinneret fiber channel, defined as the draw ratio, to provide fibers that have improved permeation properties and mechanical strength. The fiber membranes are especially useful in fluid separations that require the use of high feed pressures.

In accordance with the invention, the improved membranes are produced by first extruding a solution of a polymer or copolymer, or blends thereof into a hollow nascent membrane, preferably a hollow nascent fiber membrane. Polymers which are particularly suitable for use in the invention include hydrophillic, aromatic polymers such a those that have at least 1% water absorption at 25° C. when immersed in water at equilbrium, and which exhibit at least one non-linear subunit in the repeating unit of the main polymer chain. Examples of these polymers include but are not limited to polyaramides, polyamides, polyimides, polyamide/imides, polyamidehydrazides, polyhydrazides, polyimidazoles, polybenzoxazoles, polyester, polyester/amide, polyester/imides, polycarbonate, polycarbonate/amides, polycarbonate/imides, polysulfone/amides, polysulfone/imides, and the like.

The nascent membrane is passed through an air gap into a coagulation medium to coagulate the membrane into a sustainable structure. The resultant membrane is wound onto a takeup roll or other suitable collection device. The rate of extrusion of the polymer solution and the rate of takeup of the hollow membrane are varied to provide surprising improvements in the mechanical and permeation properties of the hollow membranes.

Although it is generally known in the art that as the draw ratio is increased, that the flux of the membrane fiber increases and the selectivity of the fiber decreases, it has, surprisingly, been discovered that the selectivity of the fiber produced by the present invention shows a constant or increased selectivity as the draw ratio is increased.

DETAILED DESCRIPTION OF THE INVENTION

Generally, and in accordance with the invention, a polymer spin dope formulation is extruded through a spinneret to provide a nascent hollow fiber. The fiber then is contacted with a fluid to coagulate the fiber into a polymer membrane.

A wide range of polymer spin dope formulations may be extruded through the spinneret to form hollow fibers. Examples of spin dope formulations that may be employed include, but are not limited to, polyaramides, polyamides, polyimides, polyamide/imides, polyamidehydrazides, polyhydrazides, polyimidazoles, polybenzoxazoles, polyester/amide, polyester/imide, polycarbonate/amides, polycarbonate/imides, polysulfone/amides, polysulfone imides, and the like, copolymers and blends thereof, and the like. Examples of these polymers include, but are not limited to those described in U.S. Pat. Nos. RE 30,351; 4,705,540, 4,717,393; 4,717,394; 4,912,197; 4,838,900; 4,935,490; 4,851,505; 4,880,442; 4,863,496; 4,961,539; and European Patent Application 0,219,878, all of which are incorporated by reference. Preferably, the spin dope formulations include at least one of either of polyamides, polyaramides, polyamide/imides and polyimides. Most preferably, the spin dope formulations include polyaramides.

The spin dope formulations suitable for use in the invention are formed by dissolving one or more of the aforementioned polymers into a solvent. Examples of such solvents include organic solvents such as N-acetylmorpholine, N,N-dimethylacetamide (DMAc), N,N-dimethylformamide (DMF), dimethylsulfoxide (DMSO), hexamethylphosphoramide, N-methylpyrolidone (NMP), N-methylacetamide, N-methylformamide, 2-pyrrolidone, triethylphosphate, and the like, as well as inorganic solvents such as sulfuric acid. Preferably, the solvents employed include NMP, DMAc, DMF, and DMSO. Most preferably, the solvent employed includes dimethylacetamide (DMAc).

The spin dope formulations employed to form the membranes of the invention have viscosities and molecular weights that enable the dope to be extruded through a spinneret to form a hollow fiber. Generally, the viscosities and molecular weights of the dope are sufficient to enable flow of the spin dope through the spinneret, but are high enough that the polymer can retain the form of the extruded hollow fiber upon leaving the spinneret. Typical zero shear viscosities of the spin dope at 70° C. are in excess of several hundred poise, preferably in the range of 1200 to 5000 poise.

As mentioned, the spin dope formulations are extruded through a spinneret to provide hollow fiber membranes. The combination of the volumetric rate of supply, measured in terms of (cubic centimeters of dope/unit time), of the spin dope to the spinneret and the rate of fiber take up can be varied to control production rate, fiber size, morphology and draw ratio. Preferably, the volume rate of supply of the dope is 50 to 500 cc/minute, most preferably, 100 to 300 cc/minute.

The spinneret employed to form the fiber membranes of the invention is generally of the tube in orifice type. Such spinnerets are well known in the art, as shown for example, in U.S. Pat. No. 4,127,625. The spinnerets employed in the process of the invention are maintained during extrusion at a temperature sufficient to attain a viscosity of the spin dope sufficient to facilitate draw down of the nascent fiber. Generally, the spinneret may be maintained at 40° to 130° C., preferably 60° to 100° C.

During spinning of the fiber in the spinneret, a bore fluid is injected within the bore of the fiber to assist in maintaining the configuration of the fiber. The bore fluid can be a mixture of a solvent and a nonsolvent for the polymer to permit a slow rate of coagulation and to permit draw down of the fiber, or it can be an inert gas such as $N_2$. Suitable bore fluids include, but are not limited to, water, N-methylpyrollidone (NMP), dimethyl formamide (DMF), and dimethylacetamide (DMAc). Preferably, the bore fluids include mixtures of solvents such as DMAc, NMP, DMF, and the like with water.

After the fibers exit the spinneret, the fibers are briefly exposed to an air gap of a gaseous atmosphere immediately prior to contacting a fluid coagulation bath. The choice of pressure, temperature, composition of the atmosphere, as well as the period of exposure of the fiber to the gaseous atmosphere are chosen to control the morphology of the nascent fiber.

Typically, the nascent fiber travels through the airgap at room temperature. The temperature of the air gap can be varied to facilitate evaporation of the solvent from the nascent fiber. Generally, the air gap may be at ambient, as well as elevated temperatures. Preferably, the air gap is at ambient temperature.

The composition of the gaseous atmosphere of the air-gap is generally chosen to facilitate evaporation of the solvent from the fiber. Possible gas compositions include, but are not limited to, air nitrogen, inert gases such as He, Ar, Xe and the like. Alternatively, reduced pressure may be employed in the air gap. Preferably, air, and inert gases can be employed in the air gap. Most preferably, air is employed in the air gap.

After contacting the gaseous atmosphere of the air gap, the fibers are passed into a coagulation bath to coagulate the fiber prior to being wound onto a takeup roll. The choice of bath composition and temperature is made to control the rate of coagulation and morphology of the fiber. Possible compositions of the coagulation bath that may be employed in the invention include, but are not limited to water, aliphatic alcohols, mixtures of aliphatic alcohols, and mixtures of aliphatic alcohols with water. Other possible compositions for the coagulation bath include aqueous solutions of DMF, NMP, and DMAc. Preferably, the composition of the coagulation bath is a mixture of aliphatic alcohols and water. Most preferably, the bath composition is water. The temperature of the coagulation bath can be varied to control the rate of coagulation and fiber morphology. Generally, the bath is maintained at a temperature of 4° to 50° C., preferably 5° to 30° C. After treatment of the fiber in the coagulation bath, the fibers are wound onto a takeup roll or other suitable collection device.

In accordance with the invention, the speed of drawing of the fiber by devices such as continuous rolls and fluid jets, and the velocity of extrusion of the fiber are controlled to affect the draw ratio to provide improved permeation and mechanical properties in the resulting fiber membranes. As the draw ratio is increased, it is surprisingly observed that both the mechanical strength and selectivity of the fibers are increased while the flux is decreased. As a further advantage, it is found that with increasing draw ratio that structurally detrimental macrovoids in the fiber wall are minimized or eliminated, thus enabling production of a macrovoid free morphology by adjusting the draw ratio in conjunction with the other spinning process variables.

The ratio of the drawing speed of the fiber to the extrusion velocity of the fiber may be varied over wide limits. Generally, the rate of extrusion velocity of the fiber may vary from 2 to 100 meters/minute, preferably 3 to 50 meters/minute, most preferably 5 to 20 meters/minute. Similarly, the rate of drawing of the fiber may vary from 5 to 500 meters/minute, most preferably 50 to 150 meters/minute.

The resulting fiber membranes are washed to remove residual solvent and the like, whereafter they are dried. Typically, washing is accomplished by placing the fiber membranes into water at 25° to 100° C., preferably 25° to 75° C. for a period sufficient to remove substantially all residual solvent as well as other impurities such as residual spin dope. Thereafter, the fibers are air dried or dehydrated by solvent exchange. For example, the polyaramide fibers employed in the following examples are two step solvent exchange dehydrated by first using methanol, and then FREON F-113. Such methods of solvent exchange dehydration are known in the art, as described in U.S. Pat. Nos. 4,080,743; 4,080,744; and 4,120,098, which are incorporated by reference herein. Alternatively, the fibers may be dehydrated by heating in atmosphere such as air, and the like.

The polymeric membranes formed in accordance with the invention are preferably in the form of hollow fibers that typically have an outside diameter of about 75 to 700 microns, desirably 100 to 300 microns. Preferably, the diameter of the bore of the fiber is 30 to 60 percent of the outside diameter of the fiber.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth in degrees Celsius; unless otherwise indicated, all parts and percentages are by weight. These surprising effects are illustrated in the following non-limiting examples.

EXAMPLES 1-3

Examples 1-3 illustrate the effect of varying the draw ratio on the $He/N_2$ permeability of polyamide fibers. In Examples 1-3, a polyaramide fiber of the structural formula:

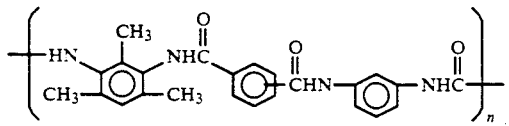

is prepared from a spin dope of 27% of the copolymer synthesized by reacting a 1:1 mole ratio of diaminomesitylene and m-phenylenediamine (DMA:MPD) with a 70:30 mole ratio of isophthaloyl chloride:terephthaloyl chloride and 30%, based on the copolymer, of $LiNO_3$ in dimethylacetamide (DMAc) solvent. The spin dope, at a temperature of 76° C., is supplied at a rate of 173 cubic centimeters per hour to a spinneret with a 22 mil outer diameter and a 10 mil inner diameter. The dope is extruded at 14.8 meters/minute and travels through an air gap of ambient atmosphere into a coagulation bath of water maintained at a temperature of 22° C. A bore fluid of 58% DMAc in water is supplied at the rate of 22 cm³/hour to the bore of the fiber being formed in the spinneret. The resultant hollow fiber is wound onto a take-up roll at rates of 97 meters/minute, 118 meters/minute, and 134 meters/minute, corresponding to draw ratios of 6.6, 8.0 and 9.1, respectively. The fibers then are solvent-exchange dehydrated by treatment with methanol and FREON F-113. The flux and selectivities of the resulting fiber membranes tested at room temperature at 600 psi with $He/N_2$ single gas are shown in Table 1.

TABLE 1

| Ex-ample | Spinneret[1] Temp. | Air[2] Gap | Takeup[3] Speed | Draw Ratio | He[4] Flux | $He/N_2$ Selectivity |
|---|---|---|---|---|---|---|
| 1 | 76 | 4.5 | 97 | 6.6 | 181 | 47 |
| 2 | 76 | 4.5 | 118 | 8.0 | 145 | 96 |
| 3 | 76 | 4.5 | 134 | 9.1 | 111 | 105 |

[1] Degrees Celsius
[2] Centimeters
[3] meters/minute
[4] GPU = $(10^{-6})cc(STP)/(cm^2\text{-sec-cmHg})$ As shown in Table 1, the selectivity increases and the flux decreases as the draw ratio increases.

EXAMPLES 4-8

In Examples 4-8, a polyaramide hollow asymmetric fiber of the formula:

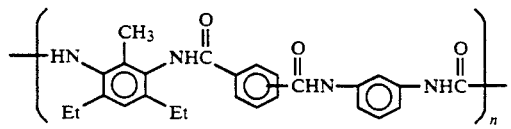

is prepared from a spin dope formulation of 27% of the copolymer synthesized by reacting a 1:1 mole ratio of diethyltoluene diamine:m-phenylenediamine with a 70:30 mole ratio of isophthaloyl chloride and terephthaloyl chloride, and 30%, based on the copolymer, of $LiNO_3$ in (DMAc). The spin dope is supplied to a spinneret with a 22 mil outer diameter and a 10 mil inner diameter at a rate of 173 cubic centimeters per hour at a temperature of 80° C. The dope is extruded through the spinneret at a rate of 14.8 meters/minute and travels through an air gap of ambient atmosphere into a coagulation bath of water at a temperature of 22° C. A bore fluid of 58% DMAC in water is supplied at the rate of 23 cm³/hour to the spinneret during extrusion of the fiber. The resultant hollow fiber membrane is wound onto a takeup roll at rates of 85 to 153 meters/minute, corresponding to draw ratios of 5.7 to 10.3. The fibers then are solvent-exchange dehydrated by treatment with methanol and FREON F-113. The resultant fluxes and selectivities of the fiber membrane at 600 psi with single gas $He/N_2$ at room temperature are shown in Table II.

TABLE II

| Ex-ample | Spinneret[1] Temp. | Air[2] Gap | Takeup[3] Speed | Draw Ratio | He Flux[4] | $He/N_2$ Selectivity |
|---|---|---|---|---|---|---|
| 4 | 80 | 7.5 | 85 | 5.7 | 132 | 8 |
| 5 | 80 | 7.5 | 100 | 6.8 | 82 | 12 |
| 6 | 80 | 7.5 | 118 | 8.0 | 57 | 34 |
| 7 | 80 | 7.5 | 134 | 9.1 | 49 | 60 |
| 8 | 80 | 7.5 | 152 | 10.3 | 39 | 90 |

[1] Degrees Celsius
[2] Centimeters
[3] meters/minute
[4] GPU = $((10^{-6})cc(STP))/(cm^2\text{-sec-cmHg})$

EXAMPLES 9-13

In examples 9-13, hollow fiber membranes of a polyaramide of a 1:1 weight blend of:

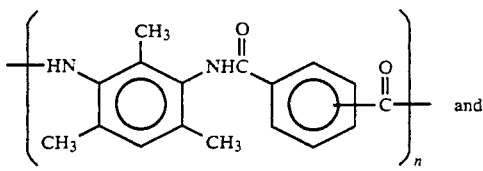

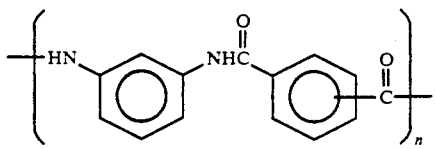

are prepared from a spin dope formulation of 27% of a blend of

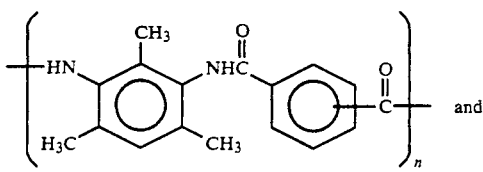

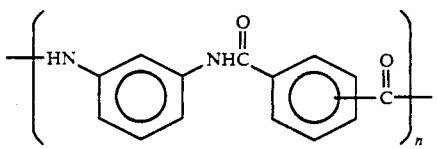

and 30%, based on the blend, of LiNO₃ in (DMAc). The spin dope is supplied to a spinneret of 33 mils outside diameter and 16 mils inside diameter at a rate of 173 cm³/hour at a temperature of 90° C. The dope is extruded through the spinneret at a rate of 6.85 meters/minute into an air gap of ambient atmosphere and then into a coagulation bath of water at a temperature of 15° C. A bore fluid of 55% DMAC in H₂O is supplied at the rate of 20 cm³/hour to the spinneret. The resultant fiber is wound onto a takeup roll at rates of 90 to 120 meters/minute, corresponding to draw ratios of 13.2 to 17.6, respectively. The fibers then are solvent exchanged dehydrated by treatment with methanol and FREON F-113. The resulting flux and selectivities of the fiber membranes at 600 psi with He/N₂ single gas at room temperature are shown in Table III.

TABLE III

| Example | Spinneret[1] Temp. | Air[2] Gap | Takeup[3] Speed | Draw Ratio | He Flux[4] | He/N₂ Selectivity |
|---|---|---|---|---|---|---|
| 9 | 90 | 1.0 | 90 | 13.2 | 224 | 3 |
| 10 | 90 | 1.0 | 120 | 17.6 | 109 | 5 |
| 11 | 90 | 0.5 | 90 | 13.2 | 117 | 4 |
| 12 | 90 | 0.5 | 120 | 17.6 | 81 | 4 |

[1]Degrees Celsius
[2]Centimeters
[3]meters/minute
[4]GPU = ((10⁻⁶)cc(STP))/cm²-sec-cmHg)

As shown in Table III, as the draw ratio increases from 13.2 to 17.6, there is no significant change in selectivity. This is surprising since the prior art suggests an opposite result. In addition, the morphology of the fiber is improved since the fiber is substantially free of macrovoids that impairs the mechanical strength of the fiber.

EXAMPLES 13-14

Hollow fiber membranes are prepared from a spin dope that includes 28% of a blend polyamide having the composition:

12.6% 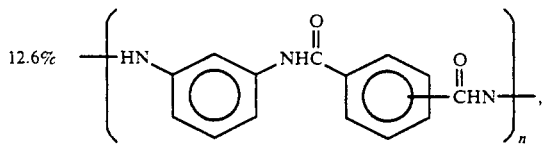

12.6% 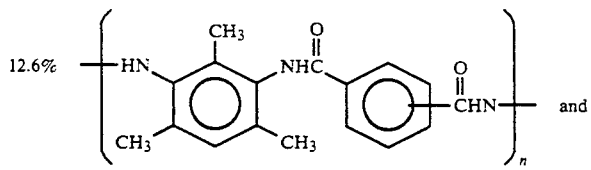 and 2.8% 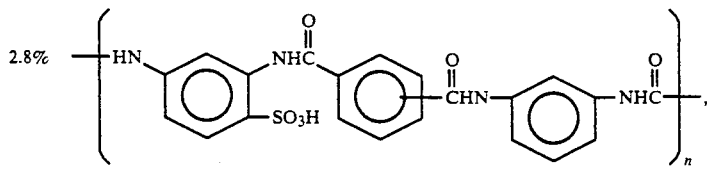

where 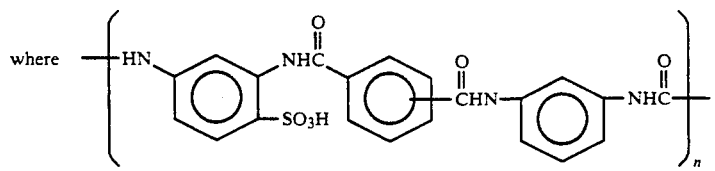

is prepared from a 88.5:11.5 mole ratio of m-phenylene diamine:m-phenylenediamine-4sulfonic acid with a 70:30 mole ratio of isophthaloyl chloride:terephthaloyl chloride. The spin dope includes 30%, based on the blend, of $LiNO_3$ in (DMAc). The spin dope is supplied at a rate of 180 $cm^3$/hour to a spinneret at a temperature of 90° C. The spinneret has an outside diameter of 33 mils and an inside diameter of 16 mils. The dope is extruded through the spinneret at a rate of 7.1 meters/minute into an air gap of ambient atmosphere and into a coagulation bath of water maintained at a temperature of 8° C. A bore fluid of 57.5% DMAc in $H_2O$ is supplied at the rate of 20 $cm^3$/hour to the spinneret. The resultant fiber is wound onto a take-up roll at rates of 50 to 90 meters/minute, corresponding to draw ratios of 7 to 12.7. The fibers then are solvent-exchange dehydrated by treatment with methanol and FREON F-113. The resultant flux and selectivities at 600 psi with single gas He/$N_2$ at room temperature are shown in Table IV.

TABLE IV

| Example | Spinneret[1] Temp. | Air[2] Gap | Takeup[3] Speed | Draw Ratio | He Flux[4] | He/$N_2$ Selectivity |
|---|---|---|---|---|---|---|
| 13 | 90 | 7.5 | 50 | 7.0 | 74 | 21 |
| 14 | 90 | 10.0 | 90 | 12.7 | 58 | 32 |

[1]Degrees Celsius
[2]Centimeters
[3]meters/minute
[4]GPU = (($10^{-6}$)cc(STP))/$cm^2$-sec-cmHg)

EXAMPLES 15-21

Filaments of the formula of Examples 9-12 is prepared. The spin dope is supplied at the rate of 173 $cm^3$/hour to a spinneret with an outside diameter of 33 mils and an inside diameter of 16 mils at a temperature of 90° C. A bore fluid of 55% DMAc in $H_2O$ is supplied at the rate of 20$cm^3$/hour to the spinneret. The dope is extruded at 6.85 meters/minute into an air gap of ambient atmosphere and then into a coagulation bath of water maintained at 6°-15° C. The resultant fiber is wound onto a take-up roll at rates of 50-100 meters/minute, corresponding to draw ratios of 7.3-14.6. The fibers then are solvent exchanged dehydrated by treatment with methanol and FREON F-113. The resulting fluxes, selectivities, and mechanical properties are given in Table V.

TABLE V

| Example | Air Gap[1] | Take-up Rate[2] | Draw Ratio | Quench Temp.[8] | 600 psi Single Gas KHe[4] | (He/$N_2$) | Ty[5] | E[6] |
|---|---|---|---|---|---|---|---|---|
| 15 | 5 | 50 | 7.3 | 15 | 105 | 10.0 | 3.3 | 104 |
| 16 | 5 | 90 | 13.2 | 15 | 68 | 9.6 | 3.8 | 133 |
| 17 | 2.5 | 50 | 7.3 | 15 | 190 | 3.6 | 3.2 | 113 |
| 18 | 2.5 | 90 | 13.2 | 15 | 92 | 4.4 | 4.1 | 142 |
| 19 | 1.0 | 50 | 7.3 | 15 | 373 | 2.4 | 3.4 | 124 |
| 20 | 1.0 | 90 | 13.2 | 15 | 105 | 3.3 | 3.8 | 125 |
| 21 | 1.0 | 100 | 14.6 | 6 | 68 | 3.7 | 4.5 | 148 |

[1]centimeters
[2]meters/minute
[3]degrees C.
[4]GPU = (($10^{-6}$)cc(STP))/$cm^2$-sec-cmHg)
[5]Yield Stress (ksi at 90° C.) is measured in extension. Yield stress is defined as the point of intersection of the tangent of the initial high slope portion of the stress-strain curve and the tangent of the immediately following, nearly flat portion of the stress-strain curve. The measurements were performed at a strain rate of 25%/minute.
[6]Elastic modulus measured in extension, according to ASTM D2256 - ksi at 90.C.

From the foregoing description, one skilled in the art can easily ascertain the essential characteristics of this invention, and without departing from the spirit and scope thereof, can make various changes and modifications of the invention to adapt it to various usages and conditions.

We claim:

1. An improved polymeric membrane that shows substantially the same or greater selectivity with increased draw ratio of manufacture comprising,
   an asymmetric polymeric membrane of a hydrophilic, aromatic polymer that has a non-linear subunit in the repeating unit of the main polymer chain
   said membrane having a selectivity with respect to at least one pair of gases.
   said selectivity remaining substantially constant or increasing as said draw ratio of manufacture of said polymeric membrane increases.

2. The membrane of claim 1 wherein said polymer is selected from the group of polyaramides, polyamides, polyimides, polyamide/imides, polyamidehydrazides, polyhydrazides, polyimidazoles, polybenzoxazoles, polyester, polyester/amide, polyester/imide, polycarbonate, polycarbonate/amides, polycarbonate/imides, polysulfone/amides, and polysulfone/imides.

3. The membrane of claim 2 wherein said polymer is a polyaramide selected from the group of

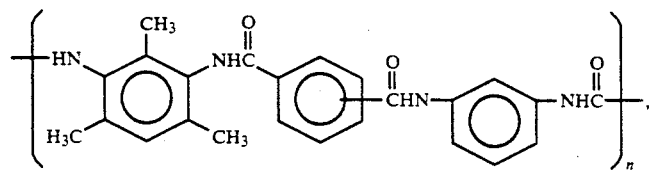

-continued
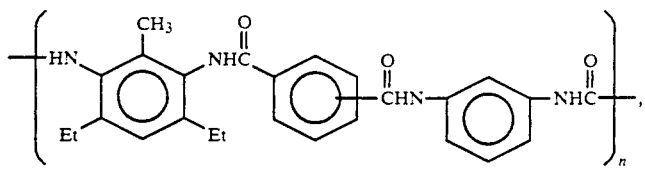
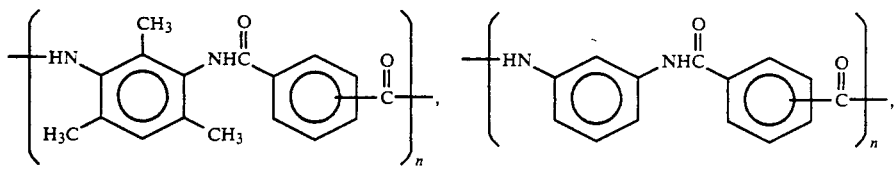
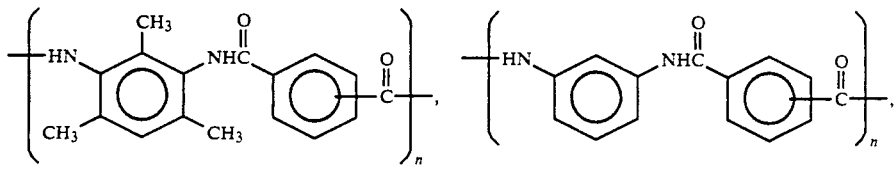
and
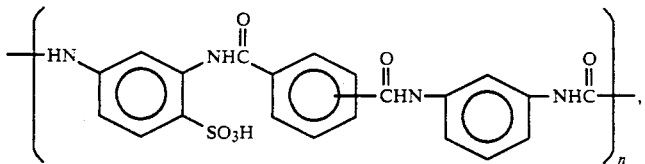
and mixtures thereof.
4. The membrane of claim 1 wherein said membrane is in the form of a hollow fiber.
5. The membrane of claim 4 wherein said membrane shows increased mechanical properties as said draw ratio is increased.
* * * * *